United States Patent [19]

Payne

[11] 4,030,026
[45] June 14, 1977

[54] SAMPLING METAL DETECTOR

[75] Inventor: George Calvin Payne, Tempe, Ariz.

[73] Assignee: White's Electronics, Inc., Sweet Home, Oreg.

[22] Filed: Nov. 25, 1974

[21] Appl. No.: 526,678

[52] U.S. Cl. .................................... 324/3; 324/41
[51] Int. Cl.² ..................... G01V 3/10; G01R 33/02
[58] Field of Search ................ 324/40 R, 41, 6, 3, 324/4; 73/194 EM; 328/166

[56] References Cited

UNITED STATES PATENTS

| | | | |
|---|---|---|---|
| 2,806,992 | 9/1957 | Foerster | 324/83 A |
| 2,808,723 | 10/1957 | Buntenbach | 73/194 EM |
| 3,316,762 | 5/1967 | Westersten | 73/194 EM |
| 3,322,967 | 5/1967 | Gessner | 328/166 |
| 3,337,796 | 8/1967 | Hentschel et al. | 324/40 |
| 3,471,772 | 10/1969 | Smith | 324/3 |
| 3,626,279 | 12/1971 | Walden | 324/3 |
| 3,707,672 | 12/1972 | Miller et al. | 324/41 |
| 3,826,973 | 7/1974 | Pflaum | 324/41 |
| 3,836,842 | 9/1974 | Zimmermann et al. | 324/41 |
| 3,852,663 | 12/1974 | Brooks et al. | 324/40 R |

Primary Examiner—Rudolph V. Rolinec
Assistant Examiner—Ernest F. Karlsen
Attorney, Agent, or Firm—Klarquist, Sparkman, Campbell, Leigh, Hall & Whinston

[57] ABSTRACT

A sampling type of metal detector is described in which an oscillator transmits an oscillator signal current through the transmit coil of the detector to produce an electromagnetic field in the region of a search head. A received signal is induced in the receive coil of the detector when a metal object is present within that portion of the electromagnetic field which is external to the search head. A sampling pulse generator produces sampling pulses, at a time related to the output signal of the oscillator, which are transmitted to a sampling circuit for sampling the received signal. In the preferred embodiment, the received signal is sampled at a time controlled by a phase shift adjustment means to produce an output sample voltage such that any indication due to mineral soils or other background conditions is excluded from the sample.

20 Claims, 8 Drawing Figures 4,030,026

SAMPLING METAL DETECTOR

BACKGROUND OF THE INVENTION

1. Field of Invention

The subject matter of the present invention relates generally to a metal detector which employs an electromagnetic field produced by a transmit coil to induce a received signal in the receive coil when a meal object is within the portion of the electromagnetic field external to the coils, and more particularly to a metal detector wherein the received signal is sampled and the sample voltage utilized to produce an output signal corresponding to a selected component of the received signal.

Possibly the greatest problem in the use of existing transmit-receive type metal detectors is their annoying generation of signals in the receive coil due to mineral soil conditions. These signals produced by soil conditions often make the detection of a small metal object, such as a coin, in areas having highly mineralized and changing soil conditionsimpossible. This problem is solved in a straighforward, simple, and inexpensive manner by using sampling to produce the output signal of the metal detector in accordance with the present invention. Thus the received signal induced in the receive coil by the metal object is sampled to produce an output voltage that ignores the changes in the received signal arising from soil conditions. For example, in a mineral soil which affects only the reactive component of the induced received signal, sampling is done at a time so that the output excludes any signal portion due to such reactive component and the changes in the reactive component caused by changes in soil conditions will be ignored. 2. Description of the Prior Art Previously known metal detectors do not utilize a sampling technique to detect the presence of metal objects by producing an output voltage representing a selected component of a signal induced in a receive coil. An eddy current testing device, disclosed in U.S. Pat. No. 3,337,796 of Hentschel, does use a sampling technique, but does not in any manner suggest that this could be employed to detect the presence of previously undetected metal objects as required by a metal detector. In Hentschel, a metal bar or other specimen to be tested is inserted into the center of a primary coil and of a secondary coil so that such specimen directly couples the primary coil to the secondary coil in order to produce an output signal from the secondary coil. Unlike this eddy current tester, in the metal detector of the present invention the received signal is induced in the received coil when a metal object is present within an electromagnetic field external to the transmit and receive coil. Thus, such eddy current tester cannot be used as a metal detector to detect previously unknown buried metal objects because these objects cannot be inserted within the primary and secondary coils.

SUMMARY OF THE INVENTION

It is one object of the present invention to provide an improved metal detector which is portable, simple to operate and inexpensive to manufacture.

Another object of the invention is to provide a metal detector which used sampling to enable detectin of a small metal object even when it is present in highly mineralized soil and other surroundings.

A further object of the present invention is to provide a metal detector which samples a predetermined portion of a received signal induced in the receive coil when a metal object is present within that portion of the electromagnetic field produced by the transmit coil at a position external to such coils.

An additional object of the invention is to provide such a sampling metal detector which uses the sample to produce a detector output signal that ignores changes in the unwanted reactance components of such received signal.

Still another object of the invention is to provide a metal detector which will ignore the presence of certain undesired conducting objects which may be present within the surroundings of the object desired to be detected.

A still further object of the invention is to provide a metal detector which rejects the changing effects of a surrounding material while maintaining maximum sensitivity to a desired object located in such material.

BRIEF DESCRIPTION OF THE DRAWINGS

Other objects and advantages of the present invention will be apparent from the following detailed description of preferred embodiments thereof and from the attached drawings of which.

DESCRIPTION OF PREFERRED EMBODIMENT

Figure 1:
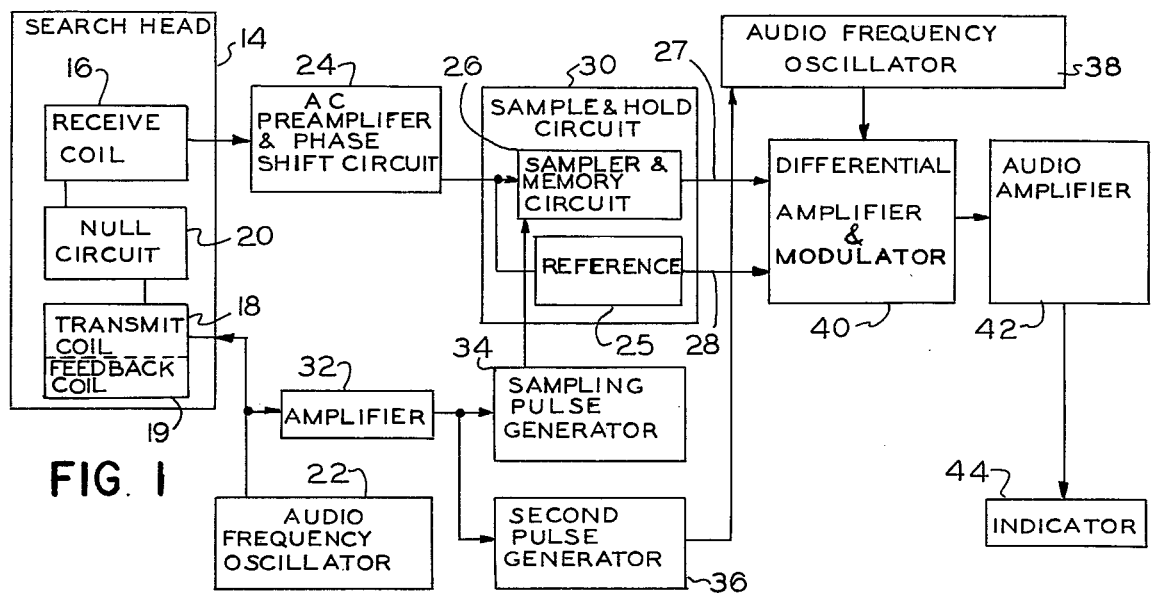
FIG. 1 is a block diagram of the metal detector in accordance with one preferred embodiment of the present invention.

As shown in FIG. 1, one embodiment of the metal detector of the present invention includes a search head 14 which contains a receive coil 16, a transmit coil 18, a feedback coil 19 and a null circuit 20. A first audio frequency oscillator 22 is connected as an input to the search head 14 to transmit an oscillator signal current through transmit coil 18 and feedback coil 19 to produce an electromagnetic field within the region adjacent the search head 14. A received signal is induced in receive coil 16 and transmitted from the output of the search head 14 when a metal object is present in that portion of the electromagnetic field external to the coils 16, 18, 19 and search head 14.

A residual voltage is induced in receive coil 16 by changing current flowing through transmit coil 18 and feedback coil 19 even when no metal object is present. Coils 16, 18 and 19 are positioned in the search head 14 so that any such residual voltage is minimized. Null circuit 20 further reduces this residual voltage towards a zero value.

The received signal is fed from the received coil through A.C. preamplifier and phase shift circuit 24 which shifts the phase of such signal relative to the output signal of first oscillator 22 to compensate for the effect of changing soil conditions on the received signal and to enable sampling to reject the reactive components of the received signal. The output of A.C. preamplifier and phase shift circuit 24 is transmitted to the inputs of a reference circuit 25 and a signal sampler and memory 26 in a sample and hold circuit 30. The amplified and phase shifted received signal is sampled and stored in a sampler and memory circuit 26 in response to a sampling pulse transmitted thereto from sampling pulse generator 34.

Figure 6:
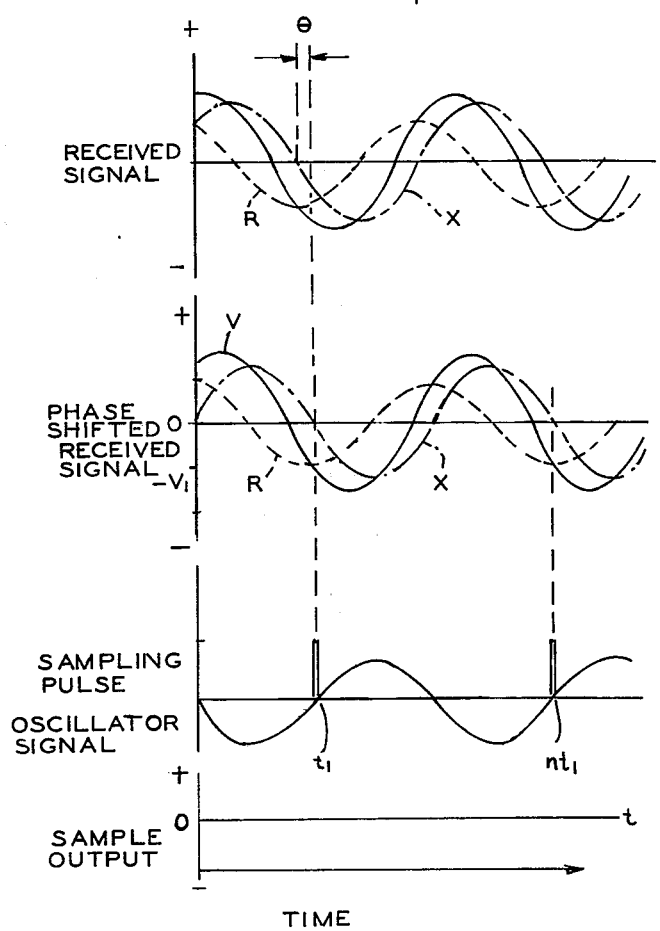
FIG. 6 is a graph showing signal waveforms present in the circuit of FIG. 2A and corresponding to the phasor diagram of FIG. 4.

A portion of the output signal of first oscillator 22 is transmitted through amplifier 32 to sampling pulse generator 34 and also to second pulse generator 36 for triggering such phase generators. Thus, sampling pulse generator 34 produces a sampling pulse having a pluse width less than one cycle of the received signal in response to the receipt of a signal output of oscillator 22, such sampling pulse having a faster rise time than the oscillator signal or the received signal, as shown in FIG. 6. The sampling pulse is transmitted to a sampler gate in the sample and hold circuit 30 to cause a portion of one cycle of the received signal to be sampled and stored in the memory of such circuit. A sampling pulse, and thus the corresponding sampling, occurs at a time when the reactive component of the received signal is zero by proper adjustment of the phase shift by circuit 24. The sample signal portion is stored in a memory capacitor within the sampler and memory circuit 26 to produce a D.C. sample voltage at output 27 representing the magnitude of the sample signal portion. A D.C. reference voltage is also produced at an output 28 of the reference circuit 25 within sample and hold circuit 30. Both of the outputs 27 and 28 are connected to the inputs of a differential amplifier and modulator 40 wherein the sample voltage amplitude modulates an audio frequency signal applied to such differential amplifier by a second audio frequency oscillator 38.

Second pulse generator 36 also produces an output pulse in response to the receipt of an output signal from first oscillator 22. The output from second pulse generator 36 is fed to the second audio oscillator 38 in order to synchronize such second oscillator to first oscillator 22. The modulated auido output signal of the differential amplifier 40 does not include any reactive components of the sampled received signal. The audio output signal is then amplified within audio amplifier 42 and transmitted to an indicator means 44 to indicate the presence of the metal object within the electromagnetic field of the search head 14.

Figure 2B:
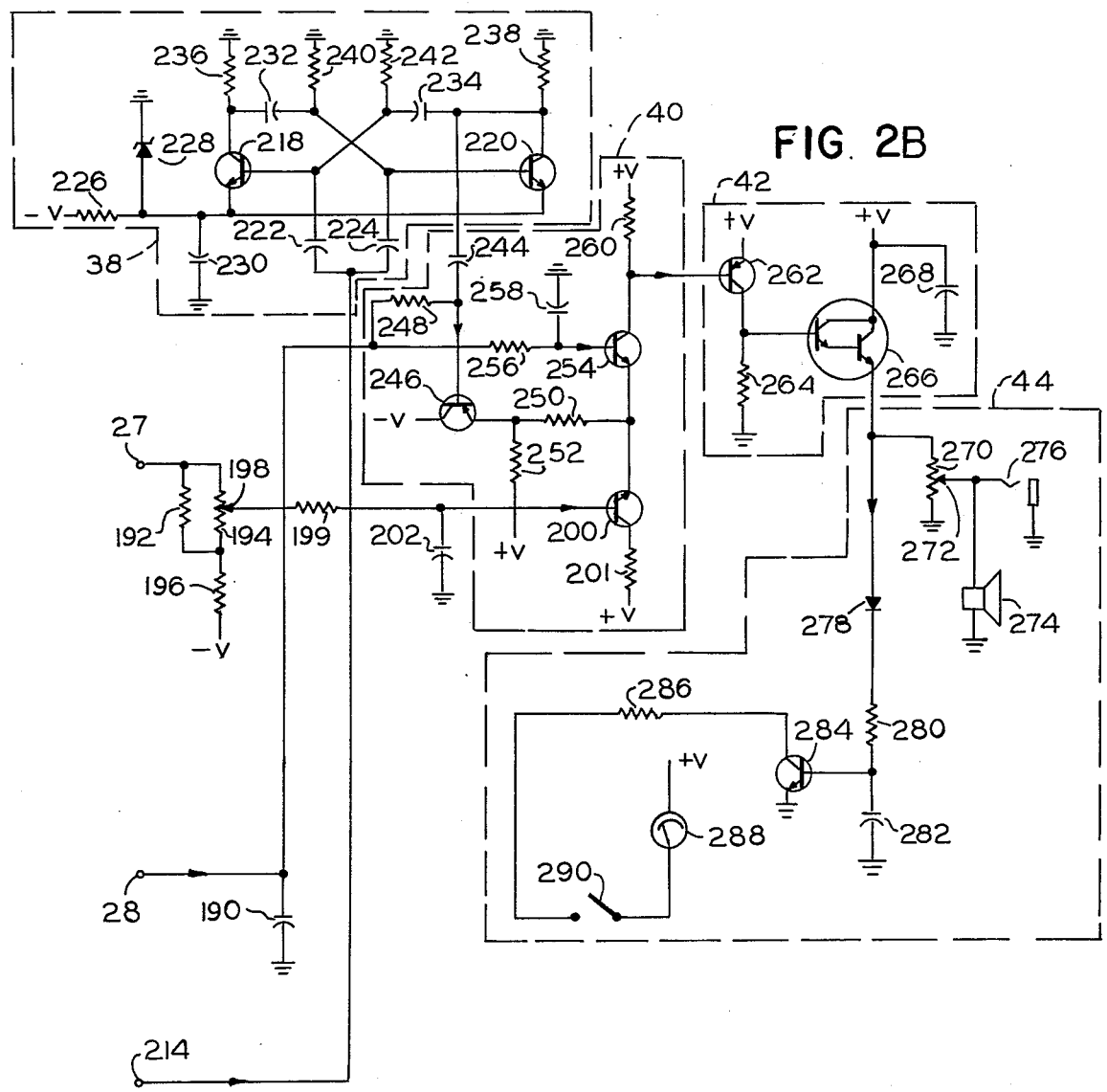
FIG. 2B is a schematic diagram of the remaining portion of the circuit shown in FIG. 2A.
Figure 2A:
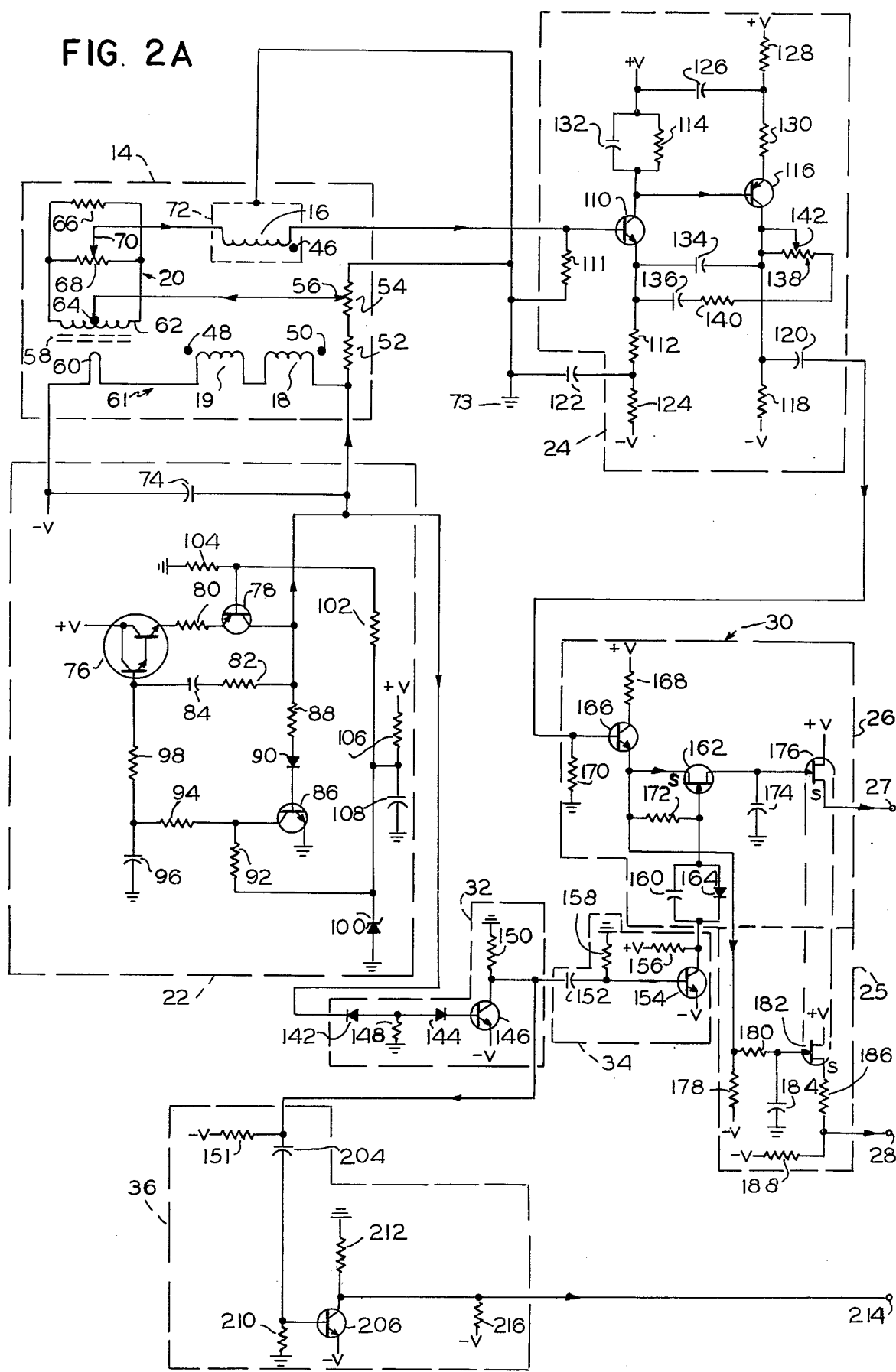
FIG. 2A is a schematic diagram of a portion of the electrical circuit of a metal detector in accordance with the preferred embodiment of FIG. 1.

The operation of the metal detector system shown in FIG. 1 can be more clearly understood with reference to FIGS. 2A and 2B, which show a more detailed circuit diagram of such a metal detector. Referring to FIG. 2A, search head means 14 comprises a common housing (not shown) which surrounds receive coil 16, transmit coil 18, feedback coil 19 and null circuit means 20 to protect these elements by sealing them from external environmental conditions such as dust, impact, and water and to support coils 16, 18 and 19 in a fixed relationship to each other.

Transmit coil 18 is connected between the output of first audio frequency oscillator 22 and feedback coil 19. The relative polarity of coils 16, 18 and 19, respectively, are indicated by polarity dots 46, 48 and 50. When transmit coil 18 and feedback coil 19 have the indicated polarities, the flux generated by a changing current flowing through transmit coil 18 tends to be cancelled by the flux generated with the feedback coil by the same current. Thus, a near zero net flux is produced by coils 18 and 19 at receive coil 16. Therefore, the residual voltage induced in receive coil 16 by the current flowing through coils 18 and 19 is constantly near zero. In the preferred embodiment, the transmit coil 18, the feedback coil 19 and the receive coil 16 are arranged in an almost coplanar layout that has been found empirically to yield a maximum sensitivity for the receive coil to produce an output signal due to presence of objects in the vicinity. The transmit coil 18 has the largest diameter of the three. The feedback coil has a diameter within + or −10% of a figure that is 36.4% of the transmit coil diameter, and is located so its perimeter approximately touches the inside of the transmit coil at one point. The receive coil 16 has a diameter within + or −10% of a figure that is 49.5% of the transmit coil diameter, and positioned so it is not quite concentric with the transmit coil, but intersects with the feedback coil so as to achieve a null. Transmit coil 18, feedback coil 19 and receive coil 16 are physically supported within the search head means 14 in a position so that the cancellation of these generated fluxes is maximized to in turn minimize this residual voltage. When coils 16, 18 and 19 are potted and cured within search head means 14, some physical movement of these coils may occur, thus causing an increase in the residual voltage. As will be later explained, due to the sampling technique employed in the preferred embodiment of FIGS. 2A and 2B, the residual voltage need not be perfectly nulled for the metal detector to operate. However, if the residual voltage is not at some minimal level, there is a tendency for the A.C. preamplifier and phase shift circuit 24 to be overdriven which causes a reduction in its dynamic range. For this reason, null circuit means 20 has been included within search head means 14 to further tune the residual voltage to a minimum. Throughout the discussion of the circuit operation, circuit values are stated that have been found operable in the preferred embodiment. It should be understood that these values are not essential to the operability of the invention, but are given so that those versed in the art may better understand how the circuit functions.

Null circuit means 20 cmprises a first resistor means which includes a 100 kilohm resistor 52 connected between the input to transmit coil 18 and one end of 100 ohm potentiometer resistor 54 whose other end is grounded. Resistor 54 has a movable contact adjustment means 56. Null circuit means 20 also includes a current transformer 58 which has a single turn primary winding 60 connected in series with feedback coil 19 and transmit coil 18. The series connection of coils 18, 19 and winding 60 is designated the loop assembly 61. Throughout the remainder of this description, the words "loop assembly" will be understood to mean the part of the circuit through which the transmit current flows, while the words "search head" will be used to described the whole assembly including the receive coil 16 and the null circuit 20. In addition, transformer 58 has a secondary winding 62 which has a center tap 64. Center tap 64 is connected to the movable contact 56 of potentiometer 54 so that a voltage having an adjustable magnitude, the magnitude depending on the position of wiper arm 56 along resistor 54, may be fed to center tap 64 from resistor 54. A one ohm load resistance 66 is connected across the terminals of secondary winding 62, and a second potentiometer resistor 68 of 100 ohms is connected in parallel with both load resistance 66 and secondary coil 62. A second adjustment means provided by the movable contact 70 of potentiometer 68 is connected to the input end of receive coil 16. Movable contact 70 is adjusted to vary the magnitude and polarity of the nulling voltage fed into receive coil 16 in a manner that will be explained below.

Figure 3:
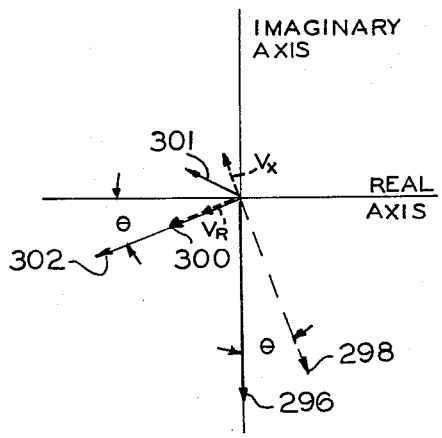
FIG. 3 is a phasor diagram of a signal waveform found in the circuit shown in FIG. 2A in absence of any target or mineralized soil.

Referring to FIG. 3, which shows a phasor diagram of the voltage and current associated with the search head 14, phasor 296 represents the total voltage produced across loop assembly 61 by the output signal of oscillator 22 and is the sum of phasors 298 and 300 which are ninety degrees in phase apart. Phasor 298 represents the reactive voltage across loop assembly 61 and phasor 300 represents the resistive voltage dropped across the internal resistance of loop assembly 61. Phasor 302 represents the current through the coils of loop assembly 61. There is a phase angle $\theta$ between reactive voltage phasor 298 and total voltage phasor 296, and also the same angle $\theta$ is between the real axis and resistive voltave phasor 300. This angle $\theta$ is usually quite small, typically around 5°.

Feedback coil 19, transmit coil 18 and receive coil 16 are initially physically placed within search head means 14 so that the previously discussed residual voltage is represented by a phasor 301 which has a reactive component phasor $V_x$ which is 180° out of phase with the reactive voltage phasor 298. In most cases, due to the particular coils chosen for use in the metal detector of the preferred embodiment, the resistive component phasor $V_r$ of the residual voltage induced into the receive coil will be in phase with resistive voltage phasor 300, although the residual resistive voltage component could also be 180° out of phase with phasor 300 and nulling by null circuit means 20, in the manner hereafter discussed, would still be possible.

The voltage across resistors 52 and 54 is the same as that across loop 61 so it will be in phase with total voltage phasor 296. Thus, the voltage across such resistors has a reactive component which is 180° out of phase with the reactive component phasor $V_x$, as well as a small resistive component in phase with the resistive residual component phasor $V_r$. A portion of such voltage is fed from the movable contact 56 of potentiometer 54 to center tap 64 and is transmitted from the movable contact 70 of potentiometer 68 through receive coil 16 to the output of the search head 14. Movable contact 56 can be adjusted until the magnitude of the reactive component of the reactive nulling voltage fed from contact 56 to center tap 64 cancels the reactive component phasor $V_x$ of the residual voltage.

The voltage produced across secondary winding 62 by current flowing in the primary winding 60 will be in phase with the current through loop assembly 61. Therefore, the voltages across resistor 54 and secondary coil 62 are separated by $90° = \theta$ or are approximately 90° out of phase with respect to each other. These two voltages are added to provide the total nulling voltage applied by movable contact 70 to the receive coil. With the movable contact or wiper arm 70 in a center position, the only voltage which will be fed into receive coil 16 by null circuit means 20 will be the reactive nulling voltage and small resistive component fed from resistor 54. Wiper arm 70 is adjusted in one direction to null any resistive component of residual voltage of one polarity and in the opposite direction to null any resistive residual component of opposite polarity. The farther the wiper arm 70 is from the center position, the greater is the magnitude of the resistive component of the nulling voltage fed into receive coil 16. Recalling that the reactive component phasor $V_x$ of the residual voltage phasor 301 has been nulled by the reactive component of the voltage from resistor arm 56, the resistive component phasor $V_r$ of the residual voltage is nulled by adjusting wiper arm 70.

Once the residual voltage has been nulled to a minimum level, wiper arms 56 and 70 are fixed in place within search head means 14 and cannot be reached or tampered with by the operator of the metal detector. Since both wiper arms 56 and 70 can be adjusted independently of each other, the residual voltage can be nulled under all conditions. This enables the production of a plurality of metal detectors whose search heads are all nulled to substantially the same minimum residual voltage levels. Receive coil 16 is surrounded by a faraday shield 72 to prevent the effects of ground and other stray capacitances from interferring with the functioning of the metal detector.

The first audio oscillator 22 includes a capacitor 74 of 1.5 microfarads connected in parallel with coils 18, 19 and 60 between the input to transmit coil 18 and a negative D.C. supply voltage of $-V$ of $-12$ volts to form with such coils a parallel resonance tank circuit for the oscillator. The symbol $-V$ which is found throughout FIGS. 2A and 2B, and in the following description, in all cases refers to the negative 12 volt D.C. supply and the symbol $+V$ refers in all cases to the positive 9 volt D.C. supply. A Darlington connected transistor pair 76 is provided in the oscillator 22 as an emitter follower amplifier and provides a voltage gain of unity and large current gain. A PNP transistor 78 connected as a common base amplifier has its emitter input connected to the emitter output of transistor 76 and its collector output connected to such tank circuit. Together these transistors 76 and 78 form the amplifier which drives the parallel resonance tank circuit.

An emitter load resistor 80 of 30 ohms connected between the emitter of transistor 76 and the emitter of transistor 78 establishes the gain of the oscillator amplifier circuit, and the collectors of transistor pair 76 are connected to the $+V$ supply. The collector of transistor 78 is connected to the input of transmit coil 18 and also through a resistor 82 of 15 kilohms in series with a 0.1 microfarad capacitor 84 to the base of transistor 76 to provide the positive feedback for oscillation.

A twelve kilohm resistor 88 is connected to the junction of resistor 82 and the collector of transistor 78. A diode 90 is connected at its anode to resistor 88 and at its cathode to the base of NPN transistor 86. Transistor 86 is connected as a common emitter amplifier with its emitter grounded and its collector connected to a 4.3 kilohm resistor 94. A bypass capacitor 96 of 5 microfarads is connected between resistor 94 and ground potential and another 4.3 kilohm resistor 98 is connected between resistor 94 and the base of transistor 76. The path from the collector of transistor 78 through resistor 88, diode 90, transistor 86, resistor 94 and resistor 98 to the base of transistor 76 provides negative feedback which tends to stabilize the output amplitude of oscillator 22. This negative feedback is A.C.

initially and is converted to D.C. by the low pass filter formed by resistor 94 and capacitor 96.

The collector of transistor 86 is connected through a 22 kilohm load resistor 92 and a one kilohm resistor 106 to the +V supply. Zener diode 100 is connected at its cathode to resistors 92 and 106 and at its anode to ground in order to regulate the voltage which operates oscillator circuit 22. A 10 microfarad capactior 108 is connected in parallel with Zener diode 100 from a point between resistors 92 and 106 to ground to filter out any Zener noise which might be occurring. A 5.6 kilohm resistor 104 is connected between the base of transistor 78 and ground and a 15 kilohm resistor 102 is connected between the base of transistor 78 and the junction of resistors 92 and 106. The base D.C. bias voltage of transistor 78 is acquired by the voltage divider action of resistors 102 and 104. An oscillator constructed in accordance with the above description produces an audio oscillator sine wave signal which has a frequency of 1760 hertz.

As shown in FIG. 2A the A.C. preamplifier and phase shift circuit 24 includes an NPN transistor 110 connected as a common emitter amplifier with its base connected to the output of the receive coil 16. A 560 ohm resistor 112 is connected between the emitter of transistor 110 and a 56 kilohm resistor 124 which is connected to the −V supply. A 22 kilohm load resistor 114 is connected between the collector of transistor 110 and the +V supply, and a 3.9 kilohm resistor 111 is connected between the base of transistor 110 and ground. The output from the collector of transistor 110 is applied to the base of PNP transistor 116, which inverts the signal. A 33 kilohm load resistor 118 is connected between the collector of transistor 116 and the −V supply and a 330 ohm resistor 130 is connected between the emitter of transmitter 116 and a 10 kilohm resistor 128 which is also connected to the +V supply. The output at the collector of transistor 116 is coupled through a 0.01 microfarad capacitor 120 to the input of sample and hold circuit 30.

To reduce the effects of noise and its associated problems, the preamplifier and phase shift circuit 24 is made into a band pass amplifier having an audio frequency range by the following components. A one microfarad capacitor 122 connected from the junction between resistor 112 and resistor 124 and ground serves as an A.C. bypass to ground for the voltage at this point. At low frequencies capacitor 122 has a large reactance. At frequencies much lower than the range of operation, the emitter resistance of the first amplifier stage including transistor 110 is approximately the sum of resistors 112 and 124. This reduces low frequency gain. At the frequencies used for operation, the effective emitter resistance of transistor 110 is merely resistor 112. The capacitor 126, of value 0.1 microfarad serves a similar function for transistor 116. At low frequencies, its emitter resistance is the sum of resistors 128 and 130. At the frequencies used for operation, it is merely resistor 130. At high frequencies a 0.001 microfarad capacitor 132 connected in parallel with resistor 114 shunts the voltage across resistor 114 and reduces the gain of preamplifier 24. To reduce distortion in the preamplifier and to provide lower gain characteristics at higher frequencies negative feedback is taken from the collector of transistor 116 and applied through a 100 micromicrofarad capacitor 134, which is connected between the collector of transistor 116 and the emitter of transistor 110. A second negative feedback path is provided to also attenuate the high frequency response of preamplifier 24. This second feedback path consists of a 100 kilohm variable resistor 138 which is connected at one end to the collector of transistor 116 and at the other end to a selected 130 kilohm resistor 140. A 390 micromicrofarad capacitor 136 is connected between the other end of resistor 140 and the emitter of transistor 110.

Preamplifier 24 produces a negative phase shift, that is to say the output voltage of preamplifier 24 lags the input voltage. The movable contact or wiper arm 142 of variable resistor 138 has its opposite end connected to the collector of transistor 116. By adjusting the position of wiper arm 142 along resistor 138, the roll-off characteristics of preamplifier 24 are changed. This causes a phase shift of the 1760 hertz received signal transmitted through such preamplifier from receive coil 16 to the input of the sampling circuit 30. This phase shift enables the sampling circuit to sample the received signal at a point where the reactive component of its waveform is zero so that reactive components of the received signal are excluded from the sample.

Figure 4:
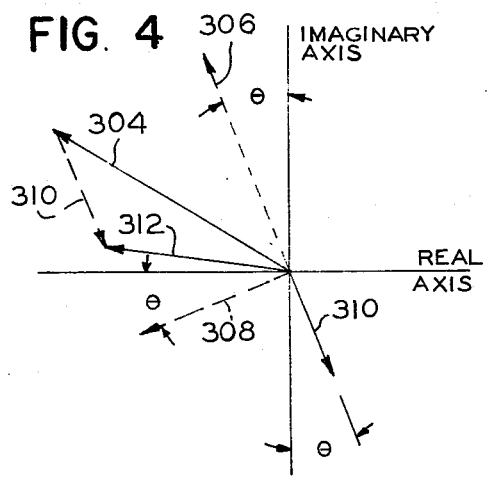
FIG. 4 is a phasor diagram of a signal waveform present in the circuit shown in FIG. 2A when a metal object is being detected in the presence of non-lossy mineral soil.

FIG. 4 shows the phasor diagram of the received signal induced in receive coil 16 when a metal object or other conductive target is within that portion of the electromagnetic field which is external to search head means 14. The imaginary axis is established in FIG. 3 by the phase of voltage 296 across the loop assembly 61. With this as a reference phasor 304 represents the voltage induced within receive coil 16 by the conductive target and can be broken into a resistive component phasor 308 and a reactive component phasor 306 which are 90 degrees apart. Phasor 306 leads the imaginary axis by an angle of $\theta$° and phasor 308 leads the real axis by an angle of $\theta$°. The magnitude of $\theta$ depends upon the impedance of loop assembly 61, specifically the ratio of the reactance to the resistance of such impedance at the working frequency. The coils chosen for use in the preferred embodiment produce an angle $\theta$ of approximately five degrees.

For reasons that will later become apparent, sampling of the received signal output from preamplifier and phase shift circuit 24 must occur at a time when the reactive coupling of the waveform represented by phasor 306 is zero. Looking at FIG. 6, this occurs when the received signal waveform has been shifted in circuit 24 an angle of $\theta$ degrees. Sampling of the phase shifted receive signal V occurs at time $t_1$ in response to the application of a sampling pulse shown, in FIG. 6 to have a pulse width less than one cycle of the periodic since wave of the received signal. The sampling pulse is produced by triggering the sampling pulse generator 34 as the sine wave voltage output of oscillator 22 passes through zero and is proceeding toward a positive voltage, such sampling pulse having a faster rise time than the oscillator signal or the received signal. At the time of sampling, the resistive component R of the phase shifted received signal V is maximum and its reactive component X is zero. Since amplifier 32, sampling pulse generator 34 an sample and hold circuit 30 produce a negligible phase shift of the output from first oscillator 22, FIG. 3 displays the phasors of the output signals of oscillator 22 which triggers the sampling pulse generator and is applied across loop assembly 61 at the time sampling occurs. At time $t_1$, the reactive component phasor 306, in FIG. 4, would be in line with the imaginary axis and will cast no shadow on the real axis, and the resistive component phasor 308 will be in line with the real axis and cast a shadow on the real axis which is equal to the magnitude of phasor 308.

FIG. 4 shows the phasors of the received signal induced in receive coil 16, from a conductive target present within the electromagnetic field. The "received signal" waveform shown in FIG. 6, at time $t_1$, corresponds to phasors 304, 306 and 308 in FIG. 4. Thus, the output received signal of preamplifier and phase shift circuit 24 must be shifted in phase to lag the phasors 306 and 308 of the input received signal of such preamplifier by $\theta°$ in order for sampling to occur at a time when only the resistive component of the received signal is present. This is shown by the shadows of phasors 306 and 308 on the real axis after they are phase shifted $\theta°$ clockwise.

The necessary phase shift of the received signal input to preamplifier and phase shift circuit 24 is accomplished by adjustment of wiper arm 142 on resistor 138 of FIG. 2A. With the wiper arm set to its center position, a negative 5° phase shift occurs in the preamplifier. With wiper arm 142 adjusted to a maximum resistance position in contact with the end of resistor 138 connected to the collector of transistor 116 a phase shift of positive 1° results, and with wiper arm 142 adjusted to a minimum resistance position in contact with the other end of resistor 138 a phase shift of negative 11° results. Thus, by adjusting wiper arm 142 the proper amount, the phase of the output received signal from preamplifier circuit 24 may be adjusted to coincide with the time for sampling only the resistive component of the received signal.

Phasor 310, shown in FIG. 4, represents a voltage which is added to phasor 304 due to a non-lossy mineralized soil condition to produce a resultant phasor 312 representing the received signal from receive coil 16 under such conditions. A non-lossy soil will produce a reactive signal component phasor 310 which is 180° out of phase with the reactive component vector 306 form the conductive target and therefore reduces the reactive component of phasor 304. However, the resistive component of phasor 312 is the same as the resistive component of phasor 304. The magnitude of the resistive component phasor 308 remains unchanged independent of the magnitude of the induced mineral voltage represented by phasor 310. Therefore, if the received signal represented by phasor 312 is shifted clockwise $\theta°$, only the resistive component 308 is sampled and non-lossy soil conditions are ignored. Any changes in the soil conditions will only change the magnitude of phasor 310 and will not affect the magnitude of phasor 308, hence these changes in soil conditions are ignored by the metal detector of the present invention.

Figure 5:
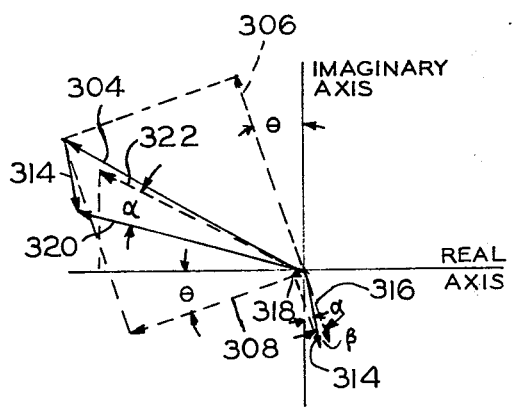
FIG. 5 is a phasor diagram of a signal waveform present in the circuit shown in FIG. 2A when a metal object is being detected in the presence of lossy mineral soil.
Figure 7:
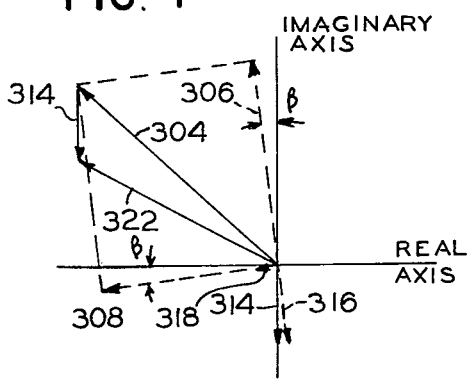
FIG. 7 is a phasor diagram similar to FIG. 5 but phase shifted by the angle a of FIG. 5.

FIG. 5 is similar to FIG. 4 except that a phasor 314 is shown representing a received signal under other mineral soil conditions, which unlike phasor 310 has a small resistive component 318 which is in phase with phasor 308. Phasor 314 also has a reactive component 316, 180° out of phase with respect to phasor 306. Due to the resistive component 318, phasor 314 will be displaced a second angle $\beta$ which is different from angle $\theta$, away from the imaginary axis. When phasor 314 is added to phasor 304, a new resultant phasor 320 results. By adjusting wiper arm 142 to shift phasor 320 clockwise through angle $\beta$ to a new position, represented by phasor 322, the shadow of phasor 322 on the real axis will be constant independent of the magnitude of phasor 314 because it now lies on the imaginary axis. This is more clearly shown in FIG. 7. Angle $\beta$ is defined as the angle between the ground's reactive component, phasor 316, and the total ground signal phasor 314. The shadow of phasor 322 on the real axis is equal to phasor 306 times the sine of angle $\beta$ plus phasor 308 times the cos of angle $\beta$. Therefore, if sampling occurs at the proper time, the sample portion of the received signal output from preamplifier 24 will be a voltage signal output proportional to angle $\beta$ as well as the components of the received signal arising from The conductive object within the electromagnetic field. Thus, again the metal detector ignores the effect of soil conditions.

A ferrous target, such as a nail, produces phasors similar to those shown in FIG. 4, except that the reactive component phasor 306 would be in phase with phasor 310 and added thereto. If the ground contains an insignificant amount of lossy material then phasor 318 will be zero and the wiper arm 142 can again be adjusted so sampling of only the resistive component phasor 308 occurs. It may be desirable for simpler operation to replace the potentiometer resistor 138 and wiper arm 142 with a multiple position siwtch and a plurality of resistors of different predetermined values which are each connected at one end to a different fixed contact of the switch and connected at their other end to a common connection at resistor 140, such switch having its movable contact connected to the collector of transistor 116.

Different objects effect the phase of the induced received signal in different manners with pull tabs from canned beverages being an example. Each pull tab of the same shape will have a similar effect on the received signal induced in the receive coil 16, and the total voltage, reactive plus resistive, arising from pull tabs can be ignored by adjusting wiper arm 142 in a manner similar to the adjustment to ignore the lossy soil reaction shown in FIG. 5. In this manner, a pull tab or any other undesirable objects of the same type which have a relatively constant effect on the induced received signal, will remain undetected by the metal detector.

A portion of the output from first oscillator 22 is fed through amplifier 32 including first and second clipping diodes 142 and 144 connected in series at their anodes, as shown in FIG. 2A. Diode 144 is also connected at its cathode to the base of NPN transistor 146 which is a common emitter amplifier. A 330 kilohm resistor 148 is connected from a point between diodes 142 and 144 to ground to forward bias such diodes by a predetermined D.C. current flowing through resistor 148 to cause a D.C. voltage drop across such resistor and provide the base drive for transistor 146. The circuit consisting of diodes 142, 144, transistor 146 and resistor 148, limits the voltage of the sine were output signal of oscillator 22 and clips the peak portions of such sine wave to reshape it into an approximately square wave. The emitter of transistor 146 is connected to the $-v$ supply and a 100 kilohm load resistor 150 is connected between the collector of transistor 146 and ground. The signal at the collector output of transistor 146 is an amplified square wave version of the output signal of the first oscillator 22.

A portion of the square wave output at the collector of transistor 146 is fed into the sampling pulse generator 34 through an 82 micromicrofarad coupling capacitor 152 connected between the collector of transistor 146 and the base of NPN transistor 154. The emitter of transistor 154 is connected to the −v supply and a 47 kilohm resistor 156 is connected between the +v supply and the collector of transistor 154. A 150 kilohm resistor 158 is connected from ground to the base of transistor 154. Transistor 154 acts as a switch and is normally biased conducting. The falling edge of the square wave output from amplifier 32 is coupled through capacitor 152 to the base of transistor 154 to switch off such transistor and cause its collector voltage to rapidly rise to a plus nine volts. Transistor 154 remains off for approximately four microseconds which is the charging time of capacitor 152 through resistor 158 so that the square wave signal is blocked by such capacitor and transistor 154 turns on again. Its collector voltage then drops to approximately a negative twelve volts where it remains until the next falling edge of the square wave output from amplifier 32 occurs. Therefore, once each cycle of first oscillator 22 a sampling pulse having a width of 4 to 5 microseconds is produced at the collector of transistor 154.

The output pulse from sampling pulse generator 34 is fed through a 15 micromicrofarad capacitor 160 to the gate of field effect transistor 162 which operates as the sampling gate of the sampler and memory circuit 26. Diode 164 is connected in parallel with capacitor 160 with its anode connected to the gate of transistor 162. The phase shifted received signal output of A.C. preamplifier and phase shift circuit 24 is applied to the base of NPN transistor 166 which is connected as an emitter follower. A parasitic suppressing resistor 168 of 150 ohms is connected between the +V supply and the collector of transistor 166. A 56 kilohm resistor 170 is connected between the base of transistor 166 and ground and provides the base drive for transistor 166. The emitter output of transistor 166 is connected to the source of field effect transistor 162. Resistor 172, of 270 kilohms, is connected between the emitter of transistor 166 and the gate of field effect transistor 162. A charge storage capacitor 174 of 0.01 microfarad is connected between the drain of field effect transistor 162 and ground. At a time when a sampling pulse is applied from sampling pulse generator 34 through capacitor 160 and diode 164 to the gate of the field effect transistor 162, field effect transistor 162 will momentarily "turn on," thus operating as a sampling gate for the duration of the sampling pulse to transmit a sample portion of the phase shafted received signal through such gate to the storage capacitor 174.

During the time the sampling pulse is occurring, diode 164 is reversed biased and resistor 172 pulls up the gate voltage of field effect transistor 162 to the same voltage as its source. Therefore, field effect transistor 162 acts as a short circuit between its source and drain during the application of the sampling pulse. Capacitor 160 discharges the stray and junction capacitances associated with the field effect transistor during "turn on." Therefore, field effect transistor 162 turns on and off very quickly.

The sample voltage which is stored in capacitor 174 is applied to the gate of an output field effect transistor 176 connected as a source follower amplifier with its drain connected to the +V supply. Field effect transistor 176 operates as a high input impedance amplifier so that it does not discharge the storage capacitor 174 and produces a D.C. sample output voltage corresponding to the magnitude of the sample portion of the received signal.

The sampling process can be more clearly understood with reference to FIG. 6 which shows the phase shifted received signal at the output of preamplifier and phase shift circuit 24. The waveform V is a sine wave which represents a received signal produced by a metal object, such as a coin, after the amplification and phase shifting by preamplifier circuit 24. Since wave V is the summation of resistive component sine wave R and reactive component sine wave X. Sine wave R leads sine wave X by 90°. The sampling pulse is produced by sampling pulse generator 34 at a time $t_1$ when the oscillator signal output of oscillator 22 crosses zero in a positive direction. This corresponds to the negative going slope of the square wave produced on the collector of transistor 146 due to the phase inversion by such transistor. As a result, sampling of the signal V occurs when waveform X is passing through zero and when waveform R is at a maximum value of $-V_1$. Thus, a portion of the received voltage V is sampled and stored to produce negative D.C. output sample voltage $-V_1$ of substantially the same value at the output 27 of sample and memory circuit 26, neglecting the D.C. offset of transistor 176. Stored sample voltage $-V_1$ has its magnitude updated with each sampling pulse, and any variation of the sampled voltage portion would appear as a step change in the level of output voltage $-V_1$ with each succeeding sampling pulse. In FIG. 6, the value of the sample voltage $-V_1$ is shown for two sampling pulses which occur when the magnitude of the maximum value of the resistive component waveform R remains constant.

The reference circuit 25 comprises a 39 kilohm resistor 178 which is connected between the −V supply and the emitter of transistor 166 and provides a portion of the load resistance of transistor 166. A one megohm resistor 180 is connected between the emitter of transistor 166 and the gate of a field effect transistor 182 which is connected as a source follower amplifier. A 0.1 microfarad capacitor 184 is connected between the gate of transistor 182 and ground potential. A low pass filter is formed by resistor 180 and capacitor 184, so that the input signal at the gate of transistor 182 is the D.C. voltage level of the signal on the emitter of transistor 166. The drain of transistor 182 is connected to the +V supply, and the source is connected through the 1.2 kilohm resistor 186 in series with 39 kilohm resistor 188 to the negative 12 volt supply. Resistors 186 and 188 function as a voltage divider and a D.C. reference voltage is obtained at an output terminal 28 between resistors 186 and 188.

In the preferred embodiment, amplifier 32, sampling pulse generator 34 and sample and hold circuit 30 have been encapsulated to improve the temperature stability of the operation of the metal detector circuit. Field effect transistors are very temperature sensitive and have a large variation in parameters. For this reason field effect transistors 176 and 182 are provided as a matched pair of transistors in a common casing so that the output signals on outputs 27 and 28 vary in a similar manner due to these factors.

The use of a differential amplifier 40 to compare the outputs from transistors 182 and 176 reduces the temperature effects on the operation of the circuit because any common mode output changes will be ignored by the differential amplifier. Thus, any such common mode changes will cause the magnitude of the output signals at outputs 27 and 28 to move in the same direction, but the difference between the outputs will remain constant. Also, this differential outputs helps to eliminate the effect of base to emitter voltage changes due to changes in temperature in transistor 166.

As shown in FIG. 2B the D.C. reference voltage signal at output 28 is fed across a three microfarad capacitor 190 connected from such output to ground. This capacitor filters out any residual A.C. signal which may be present in the D.C. reference voltage output signal. The D.C. sample voltage signal at output 27 is applied to a 5 kilohm potentiometer resistor 194 which is connected from output 27 in series with a 39 kilohm resistor 196 to the −V supply. A 4.7 kilohm resistor 192 is connected in parallel with resistor 194 so that their total effective resistance is approximately 2.5 kilohms. The movable contact or wiper arm 198 of potentiometer resistor 194 is connected through a 15 kilohm resistor 199 to one input of the differential amplifier 40 at the base of an NPN transistor 200. Adjustment of wiper arm 198 varies the magnitude of the sample output voltage applied to the differential amplifier and operates as a tuner control to effect the output of audio amplifier 42 in a manner that will be explained later. The voltage divider formed by resistors 186 and 188 at the output 28 in FIG. 2A is necessary to insure that the output of audio amplifier 42 would be null when wiper arm 198 is near the center of its rotation. A 0.5 microfarad capacitor 202 is connected between the base of NPN transistor 200 and ground. Resistor 199 and capacitor 202 together form a low pass filter to remove noise from the sample output voltage signal.

Going back for a moment to amplifier circuit 32 in FIG. 2A, a portion of the square wave output from amplifier 32 is applied through a 100 micromicrofarad capacitor 204 to the base of NPN transistor 206 which acts as a switch in the second pulse generator 36. Resistor 210 of 150 kilohms is connected between ground and the base of transistor 206. Transistor 206 has its emitter connected directly to the −V supply and its collector is connected through 47 kilohm load resistor 212 to ground. A 3.3 kilohm resistor 216 is connected between the collector of transistor 206 and −V supply. The second pulse generator 36 produces an output pulse on an output terminal 214 at the collector of transistor 206 in much the same manner as the pulse produced by sampling pulse generator 34. The falling front edge of the inverted square wave output of amplifier 32 is coupled through capacitor 204 to the base of transistor 206 and momentarily turns off such transistor causing its collector voltage to rise to −11.2 volts. After capacitor 204 has charged through resistor 310 to a point where transistor 206 again conducts, the collector voltage of transistor 206 will drop to approximately a negative 12 volts, thereby terminating the positive going pulse produced at output 214. Once each cycle of oscillator 22, such pulse is produced at the collector output 214 of transistor 206 which is used to synchronize the frequency of the second audio oscillator 38 to oscillator 22 as hereafter described.

The second audio oscillator 38 is shown in FIG. 2B and includes a pair of NPN transistor 218 and 220 connected as a free running multivibrator oscillator. Pulses from output 214 are applied to the common terminal of a pair of 150 micromicrofarad capacitors 222 and 224, capacitor 222 being connected to the base of transistor 218 and capacitor 224 being connected to the base of transistor 220. The emitters of transistors 218 and 220 are connected together and also are connected through a 3.3 kilohm resistor 226 to the −V supply. A Zener diode 228 is connected between the emitter of transistor 218 and ground to regulate the voltage at the emitters of transistors 218 and 220 to approximately a negative 6.6 volts. A 10 microfarad capacitor 230 is connected between the emitter of transistor 218 and ground to filter out any Zener noise which may be occurring at this point. A 0.01 microfarad capaitor 232 is connected between the collector of transistor 218 and the base of transistor 220, and a 0.01 microfarad capacitor is also connected between the collector of transistor 220 and the base of transistor 218 to provide positive feedback for oscillation. A 22 kilohm load resistor 236 is connected between the collector of transistor 218 and ground and a similar 22 kilohm load resistor 238 is connected between the oscillator of transistor 220 and ground. A pair of 200 kilohm resistors 240 and 242 are connected between the bases of transistors 220 and 218, respectively, and ground. The audio output signal of the second audio frequency oscillator 38 is taken from the collector of transistor 220 and applied to the differential amplifier 40 for modulation purposes.

Second audio frequency oscillator 28 operates in a conventional manner as described on page 72 of RCA Transistor Manual, Technical Series SC-12, published in 1966, and due to the chosen values of resistances and capacitances would normally oscillate at a frequency of approximately 330 hertz. However, due to the synchronization pulse applied thereto by the output 214 of the second pulse generator 36, oscillator 38 runs at a slightly higher frequency of 440 hertz which is synchronized to the first oscillator 22 and is exactly one-fourth the frequency of first oscillator 22. If there were no synchronization of oscillator 22 and oscillator 38, these oscillators would tend to lock in periodically and produce a quivering tone in the audio signal output of audio amplifier 42.

The output of second oscillator means 38 is A.C. coupled through a one microfarad capacitor 244 to the base of PNP emitter follower transistor 246 in the differential amplifier 40 of FIG. 2B. A 75 kilohm resistor 248 is connected between D.C. reference output 28 and the base of transistor 246 in order to provide the D.C. bias for the operation of transistor 246. The collector of transistor 246 is connected directly to the −V supply and its emitter is connected through a 5.6 kilohm resistor 250 to the common emitter connection of transistor 200 and a transistor 254 which form the differential amplifier. A 150 kilohm resistor 252 is connected between the emitter of transistor 246 and the +V supply. A two kilohm resistor 256 is connected between the base of transistor 254 and D.C. reference output 28 and a 1 microfarad capacitor 258 is connected between the base of transistor 254 and ground. The collector of transistor 254 is connected through a 12 kilohm resistor 260 to the +V supply. The output of differential amplifier 40 is taken from the collector of transistor 254. The differential amplifier modulates the audio frequency signal of the multivibrator oscillator 38 to produce an audio frequency output signal which is amplitude modulated by the sample voltage applied to such amplifier in a manner hereafter described.

When receive coil 16 is nulled correctly by potentiometers 54 and 68 and no conducting object is present within the electromagnetic field of the search head 14, the sample voltage portion of the received sine wave signal taken at axis crossover produces a sample voltage of about −0.7 volt on the memory capacitor 174 in the sampler and memory circuit 26 in FIG. 2A. This corresponds to a −0.7 volt D.C. bias voltage provided on the emitter of transistor 166 for forward biasing because the base of such transistor is approximately at D.C. ground. The D.C. voltage of −0.7 voltage is stored by the reference storage capacitor 184 and reverse biases the gate of the N- channel field effect transistor 182 so that the corresponding D.C. reference voltage of about +1.0 volt is produced at output 28. For the case where multivibrator transistor 220 is in its "on" state, a voltage will be transferred through capacitor 244 to the base of transistor 246. The resulting voltage at the emitter of transistor 246 will be negative with respect to the base voltages of transistors 200 and 254. Therefore, both transistors 200 and 254 will be biased conducting. Transistor 200 is biased slightly more conducting than 254 by the sample output voltage on the movable contact of potentiometer resistor 194 which is set more positive than the D.C. reference voltage. The current flow through transistor 254 will produce a voltage drop across resistor 260 such that transistor 162 is conducting. The resulting voltage across resistor 164 will bias transistor 266 slightly conducting. However, when transistor 220 is "off" the voltage supplied through emitter follower transistor 246 will reverse bias the base to emitter junction of both transistors 200 and 254. As a result transistors 200, 254, 262 and 266 will be in the "off" state. Therefore since multivibrator oscillator 38 is continually changing states a negative going square wave will be produced at the collector of transistor 254. This is a low amplitude audio frequency signal which is transmitted through the amplifier 42 and produces a low sound level at the loudspeaker connected to the output of amplifier 42.

When a conducting object is present within the field of search head means 14, a more negative sample voltage is obtained because the received signal contains a higher magnitude of the resistive component corresponding to phasor 308. This negative D.C. sample voltage is fed through the source follower field effect transistor 176 to the base of transistor 200 from the movable contact 198 to potentiometer resistor 194. The negative D.C. signal is transmitted from the emitter of transistor 200 to the emitter of transistor 254 and biases transistors 254 more into conduction. As a result, the negative square wave signal produced on the collector of transistor 154 by the multivibrator oscillator 38 is increased in amplitude in accordance with the magnitude of the sample voltage. This amplitude modulation of the audio frequency output signal of the differential amplifier modulator 40 produces a louder sound at the speaker which indicates the presence of the metal object.

The modulated audio signal voltage across resistor 260 is applied to the base of a PNP transistor 262 connected as a common emitter amplifier in the audio amplifier 42. Transistor 262 has its emitter connected to the positive 9 volt supply and its collector connected through a load resistor 264 of 22 kilohms to ground. Transistor 262 inverts and amplifies the signal from the collector of transistor 254 and applies such signal to the base of a pair of transistors connected as a Darlington type of emitter follower circuit 266 to produce enough output signal current to drive indicator means 44 connected to the emitter output of such circuit. The common collector of Darlington transistor pair 266 is connected directly to the positive nine volt supply and has a 470 microfarad capacitor 268 connected between the collector and ground to supply the large surge currents required by the indicator means 44 and thereby filter out ripple occurring on the positive 9 volt supply. The output from the emitter of transistor pair 266 is fed into the indicator means 44 which includes a 100 ohm potentiometer resistor 270 which is connected between such emitter and ground. The movable contact or wiper arm 272 of resistor 270 is connected to a 16 ohm speaker coil of a load 274. Speaker 274 produces a sound output whose loudness corresponds to the magnitude of the output signal from the emitter of transistor 266. Movement of wiper arm 272 adjusts the magnitude of the audio level of the sound from the speaker 274 and may be connected to ground when an audio output is not desired. A rectifier diode 278 is connected between the emitter output of transistor pair 266 and a 6.2 kilohm resistor 280 to rectify the audio A.C. signal. Resistor 280 is connected to the base of NPN transistor 284 connected as a common emitter amplifier. A one microfarad capacitor 282 is connected between the base of transistor 284 and ground in order to filter out residual A.C. components at this point. The emitter of transistor 284 is connected directly to ground and a 1.5 kilohm resistor 286 is connected between the collector of transistor 284 and switch 290. A sensitive milliammeter 288 is connected between such switch and the +V supply. When switch 290 is closed a portion of the rectified output current from the emitter of transistor 266 is fed through meter 288 to give a visual indication of the magnitude of the output signal from transistor 266. Thus, indicator means 44 is capable of producing either an audio indication, or a visual indication, or both, corresponding to the magnitude of the sampled portion of the received signal induced in the received coil of the search head.

The preferred embodiment described above can be modified in the following manner and satisfactory performance will still result. The signal from receive coil 16 can also be fed into a second sampler and memory circuit like sampler 26 which samples the received signal in response to a pulse received from a second sampling pulse generator at a different time than the sampling pulse from sampling pulse generator 34. A one-shot or monostable multivibrator can be connected between the output of the amplifier 32 and a second sampling pulse generator so that it produces a sampling pulse input to the second sampler and memory circuit which is delayed from the sampling pulse to sampler and memory circuit 26. As a result the two sample portions of the received signal are sampled at two different sampling angles relative to the zero axis crossover of the resistive component of such received signal, and the sampling points are separated by less than 90 degrees. The outputs from these sampler and memory circuits would be fed into a comparator and would each have a magnitude corresponding to the summation of a resistive component and a reactive component of the received signal. The reactive components of such two output signals are equalized by multiplying them by different constants related to the cosine of the sampling angles before such output signals are applied to the comparator. Therefore, that portion of magnitude of each output representing the reactive component of the induced received signal would be canceled in the comparator and such comparator produces an output which again represents only the resistive component of the induced received signal times a constant less than unity.

A second modification of the circuit of FIG. 1 involves taking both the resistive and reactive components of the received signal and transmitting them from the preamplifier 24 into a comparator. A portion of the output of the comparator is then fed through a negative feedback loop including the sampler 26 which samples the comparator output in response to a sampling pulse which is applied to the sampler at a time when only the reactive component of the received signal is present. The output from this sampler and memory circuit is used to amplitude modulate a sine wave which is 180° out of phase with the received signal input to the comparator. The modulated sine wave is fed into the comparator where it is added to the received signal to remove the reactive component of the received signal. Thus again the comparator produces a detector output which represents only the resistive component of the induced received signal.

Also, this invention is not limited to the arrangement of coils in the search head 14, described as preferred in the preferred embodiment. In fact, for some purposes other forms may prove superior. One such alternative would use a single transmit coil, without any feedback coil, while employing two receive coils, the arrangement of which is designed to produce a null.

Such differences in coil configuration are known, by those versed in the art, to result in improved sensitivity of the detector to different kinds of metal objects, disposed at various distances and in various dispositions to the search head. The essential intent of this invention is to provide, through the sampling technique, a means of providing effective detection where previously such detection had been difficult or impossible.

While I have shown and described a preferred embodiment of my invention, it will be apparent to those skilled in the art thay many other changes may be made without departing from my invention in its broader aspects. Therefore, the scope of the present invention should only be determined by the following claims.

I claim:

1. A sampling metal detector comprising:
   transmit coil means;
   receive coil means;
   search head means for enclosing and supporting said transmit coil means and said receive coil means in such a manner as to enable the detection of metal objects in an unabservable position external to the search head;
   a first oscillator coupled to said transmit coil for transmitting a sinusoidal oscillator signal through said transmit coil to produce a changing electromagnetic field in the region of said search head means and cause a received signal to be induced in said receive coil during the transmission of said oscillator signal when a metal object is within the portion of said electromagnetic field which is external to said coil means and said search head means thereby enabling the detection of the metal object, said received signal including a mineral soil signal component when said metal object is located in mineralized soil;
   sampling pulse generator means for producing sampling pulses at a time related to the output signal of said oscillator, said sampling pulses having a pulse width less than one cycle of said received signal and having a faster rise time than the oscillator signal;
   sampling means coupled to the output of said sampling pulse generator means and having its input connected to the output of said receive coil means, for sampling said received signal at a position on its waveform where the mineral soil signal component of said received signal is of a minimum amplitude for a time period corresponding to the width of the sampling pulse to produce an output sample voltage corresponding to the sampled portion of one cycle of the received signal; and
   output means for producing an output signal corresponding to a selected component of the received signal in response to the output sample voltage.

2. A metal detector in accordance with claim 1 in which the sampling means is a sample and hold circuit means including a charge storage means for storing the output sample voltage and the sampling pulse generator is coupled to the first oscillator for producing the sampling pulses.

3. A metal detector according to claim 1 including adjustable phase shift means for varying the phase relationship between said received signal and said sampling pulse.

4. A metal detector according to claim 2 including a null circuit means coupled to said transmit coil and to said receive coil for reducing to a minimum any residual voltage which is induced in said receive coil by a current flowing through said transmit coil when no material is present within said electromagnetic field.

5. A metal detector according to claim 4 including a feedback coil having a polarity opposite to the polarity of said transmit coil so that current flowing through said feedback coil causes a reduction of said residual voltage, and wherein said null circuit means comprises a transformer having a primary coil connected in series with said transmit coil, said transformer also having a secondary coil with a center tap, a load resistance being connected across said secondary coil, first resistor means connected between the input to said transmit coil and ground, first adjustment means for connecting the first resistor means to the center tap and for adjusting the resistance provided by the first resistor means between the input to said transmit coil and said center tap to apply a first adjustable voltage to said center tap from said transmit coil input, a second resistor connected in parallel with said load resistance and said secondary coil, second adjustment means for connecting the second resistor to the input of the receive coil and for adjusting the magnitude and polarity of a second voltage which is fed to said receive coil from said second resistor wherein the residual voltage produced at the output of said receive coil is reduced to a minimum.

6. A metal detector according to claim 3 including a preamplifier means connected between said receive coil and the input of said sample and hold circuit means for amplification of said received signal, said phase shift means being connected to said preamplifier means for shifting the phase of the received signal.

7. A metal detector according to claim 2 wherein said sample and hold circuit means produces a direct current sample voltage output representing the magnitude of the sampled portion of said received signal, and which also includes direct current amplifier means coupled to the output of said sample and hold circuit means and a second oscillator means coupled to said direct current amplifier means, wherein such direct current amplifier means produces a modulated audio output signal representing the magnitude of the sampled portion of said received signal.

8. A metal detector according to claim 7 which includes second pulse generator means connected between said second oscillator means and the output of said first oscillator for synchronization of said second oscillator means with said first oscillator, said first and second oscillators both being audio frequency oscillators.

9. A metal detector according to claim 7 wherein said sample and hold circuit means includes means for producing a second direct current voltage output for use as a reference signal, wherein said direct current amplifier means comprises a differential amplifier means having its input coupled to the two outputs of said sample and hold circuit means, said differential amplifier producing said modulated audio output signal at the output thereof.

10. A metal detector according to claim 9 including an audio amplifier coupled to the output of said differential amplifier for amplification of said modulated audio output signal, and the indicator means connected to the output of said audio amplifier and for producing an audible and a visual indication of the magnitude of said modulated audio output signal.

11. A metal detector apparatus comprising:
a transmit coil;
a receive coi;
search head means for enclosing and supporting said transmit coil and said receive coil is fixed relationship within a sealed housing to enable the detection of metal objects in an unobservable position external to the coils;
a first oscillator coupled to said transmit coil means for transmitting a sinusoidal oscillator signal through said transmit coil to produce a changing electromagnetic field in the region of said search head means and for causing a received signal to be induced in said receive coil during the transmission of said oscillator signal when a metal object is within the portion of said electromagnetic field which is external to said coils and said search head means, thereby enabling the detection of the metal object, said received signal including a background signal component when said object is located in a background of mineralized soil or other undesired objects;
sampling pulse generator means coupled to the output of said first oscillator for producing at least one sampling pulse in response to the output signal of said oscillator, said sampling pulse having a pulse width less than one cycle of said received signal and a faster rise time than the oscillating signal;
sample and hold circuit means coupled to the output of said sampling pulse generator means and coupled to the output of said receive coil, for sampling said received sighal at a position on its waveform where the background signal component of said received signal is of a minimum amplitude when a sampling pulse is applied thereto, and thereby providing a sample signal corresponding to the sampled portion of one cycle of the received signal which is stored to produce an output sample voltage at the output of said sample and hold circuit means; and
adjustable phase shift means for varying the phase relationship between said received signal and said sampling pulse to compensate for differing soil conditions and objects desired to be excluded from detection.

12. A metal detector apparatus in accordance with claim 11 which also includes audio signal generator means coupled to the output of said sample and hold circuit means for producing an audio output signal which is amplitude modulated by said output sample voltage.

13. A metal detector apparatus in accordance with claim 11 wherein said sampling pulse generator means applies a sampling pulse to said sample and hold circuit means for causing sampling of said received signal at a time when only the resistive component of said received signal is present within said sample and hold circuit means so that the said output sample voltage represents said resistive component of said received signal arising from the metal object desired to be detected and not its reactive component.

14. A metal detector apparatus according to claim 11 including null circuit means coupled to said transmit coil means and to said receive coil means for reducing to a minimum any residual voltage which is induced in said receive coil means by current flowing in said transmit coil even when no material is present within said electromagnetic field, and also including a feedback coil having a polarity opposite to the polarity of said transmit coil so that current flowing through said feedback coil causes a reduction of said residual voltage.

15. A metal detector apparatus according to claim 14 including bandpass preamplifier means connected between said receive coil means and said sample and hold circuit means for amplification of said received signal, said bandpass preamplifier means including said phase shift means.

16. A metal detector apparatus according to claim 15 wherein said sample and hold circuit means produces a direct current output sample voltage, said audio signal generator means comprises direct current amplifier means coupled to the output of said sample and hold circuit means for receiving said direct current output sample voltage, second oscillator means of an audio frequency, and second pulse generator means coupled between the output of said first oscillator and said second oscillator means for synchronizing said second oscillator means to said first oscillator, said second oscillator means being coupled to the input of said direct current amplifier means to that said output sample voltage amplitude modulates an audio frequency signal from said second oscillator means thereby producing a modulated audio output signal at the output of said direct current amplifier means representing the magnitude of the sampled portion of the received signal.

17. A metal detector apparatus according to claim 16 wherein said sample and hold circuit means includes a low frequency filter and amplifier means connected to the received signal input of said sample and hold circuit for producing a second direct current voltage output for use as a reference signal, and direct current amplifier means comprises differential amplifier means coupled to said two voltage outputs of said sample and hold circuit means.

18. A metal detector apparatus according to claim 17 including an audio amplifier coupled to the output of said direct current amplifier means for amplification of said audio output signal and indicator means connected to said audio amplifier for producing an audible and a visual output for the metal detector apparatus.

19. A metal detector apparatus according to claim 13 wherein said sample and hold circuit means includes sampler and memory circuit means comprising sampling gate means connected to the received signal input of said sample and hold circuit means and coupled to the output of said sampling pulse generator means, charge storage means connected to the output of said sampling gate means, and first amplifier means connected to the output of said charge storage means, wherein a pulse from said sampling pulse generator means renders said sampling gate means conducting at a time when the reactive component of said received signal is zero.

20. A metal detector according to claim 1 in which the first oscillator applies a periodic, multiple cycle sine wave signal to the transmit coil to enable the detection of nonresonant metal objects.

* * * * *

UNITED STATES PATENT OFFICE
CERTIFICATE OF CORRECTION

PATENT NO. : 4,030,026  
DATED : June 14, 1977  
INVENTOR(S) : GEORGE CALVIN PAYNE Page 1 of 3

It is certified that error appears in the above-identified patent and that said Letters Patent are hereby corrected as shown below:

Column 1, line 9, "meal" should be --metal--.

Column 1, line 10, "the" first occurrence should be --that--.

Column 1, line 22, "conditionsimpossible" should be --conditions impossible--.

Column 1, line 64, "used" should be --uses--.

Column 1, line 64, "detectin" should be --detection--.

Column 2, line 48, "a" should be --$\alpha$--.

Column 3, line 3, before "coil", "received" should be --receive--.

Column 3, line 20, "phase" should be --pulse--.

Column 3, line 21, "pluse" should be --pulse--.

Column 3, line 49, "auido" should be --audio--.

Column 4, line 64, "described" should be --describe--.

Column 5, line 61, "=" should be -- - --.

Column 8, line 61, "an" should be --and--.

Column 9, line 40 "form" should be --from--.

Column 9, line 62, "$\beta$" should be --$\alpha$--.

UNITED STATES PATENT OFFICE
CERTIFICATE OF CORRECTION

PATENT NO. : 4,030,026  
DATED : June 14, 1977  
INVENTOR(S) : GEORGE CALVIN PAYNE Page 2 of 3

It is certified that error appears in the above-identified patent and that said Letters Patent are hereby corrected as shown below.

Column 9, line 66, "$\beta$" should be --$\alpha$--.

Column 9, line 68, after "be" insert --a--.

Column 10, line 23, "siwtch" should be --switch--.

Column 10, line 55, "were" should be --wave--.

Column 11, line 48, "shafted" should be --shifted--.

Column 12, line 7, "since" should be --sine--.

Column 13, line 1, "outputs" should be --output--.

Column 13, line 50, "310" should be --210--.

Column 13, line 60, "transistor" should be --transistors--.

Column 14, line 8, "capaitor" should be --capacitor--.

Column 14, line 16, "oscillator" should be --collector--.

Column 14, line 23, "28" should be --38--.

Column 15, line 22, "164" should be --264--.

Column 15, line 42, "to" should be --of--.

Column 15, line 45, "transistors" should be --transistor--.

Column 15, line 47, "154" should be --254--.

UNITED STATES PATENT OFFICE
CERTIFICATE OF CORRECTION

PATENT NO. : 4,030,026

DATED : June 14, 1977

INVENTOR(S) : GEORGE CALVIN PAYNE

It is certified that error appears in the above-identified patent and that said Letters Patent are hereby corrected as shown below.

Claim 1, Column 17, line 48, "unabservable" should be --unobservable--.

Claim 11, Column 19, line 28, "coi" should be --coil--.

Claim 11, Column 19, line 30, "is" should be --in--.

Claim 11, Column 19, line 53, "oscillating" should be --oscillator--.

Claim 11, Column 19, line 57, "sighal" should be --signal--.

Claim 16, Column 20, line 47, "to" should be --so--.

Claim 17, Column 20, line 59, "and" should be --said--.

Signed and Sealed this

Thirty-first Day of January 1978

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

Patent No. 4,030,026　　　　　　　　Dated June 14, 1977

Inventor(s)　GEORGE CALVIN PAYNE

It is certified that error appears in the above-identified patent and that said Letters Patent are hereby corrected as shown below:

Column 1, line 9, "meal" should be --metal--.

Column 1, line 10, "the" should be --that--.

Column 1, line 22, "conditionsimpossible" should be --conditions impossible--.

Column 1, line 64, "used" should be --uses--.

Column 1, line 64, "detectin" should be --detection--.

Column 2, line 48, "a" should be --$\alpha$--.

Column 3, line 3, before "coil," "received" should be --receive--.

Column 3, line 20, "phase" should be --pulse--.

Column 3, line 21, "pluse" should be --pulse--.

Column 3, line 49, "auido" should be --audio--.

Column 4, line 64, "described" should be --describe--.

Column 5, line 61, "=" should be -- - --.

Column 8, line 61, "an" should be --and--.

Column 9, line 40, "form" should be --from--.

Column 9, line 62, "$\beta$" should be --$\alpha$--.

UNITED STATES PATENT OFFICE
CERTIFICATE OF CORRECTION

Patent No. 4,030,026                     Dated June 14, 1977

Inventor(s)  GEORGE CALVIN PAYNE

It is certified that error appears in the above-identified patent and that said Letters Patent are hereby corrected as shown below:

Column 9, line 66, "$\beta$" should be --$\alpha$--.

Column 9, line 68, after "be" insert --a--.

Column 10, line 23, "siwtch" should be --switch--.

Column 10, line 55, "were" should be --wave--.

Column 11, line 48, "shafted" should be --shifted--.

Column 12, line 7, "since" should be --sine--.

Column 13, line 1, "outputs" should be --output--.

Column 13, line 50, "310" should be --210--.

Column 13, line 60, "transistor" should be --transistors--.

Column 14, line 8, "capaitor" should be --capacitor--.

Column 14, line 16, "oscillator" should be --collector--.

Column 14, line 23, "28" should be --38--.

Column 15, line 22, "154" should be --264--.

Column 15, line 42, "to" should be --of--.

Column 15, line 45, "transistors" should be --transistor--.

Column 15, line 47, "154" should be --254--.

UNITED STATES PATENT OFFICE
CERTIFICATE OF CORRECTION

Patent No. 4,030,026          Dated June 14, 1977

Inventor(s)     GEORGE CALVIN PAYNE

It is certified that error appears in the above-identified patent and that said Letters Patent are hereby corrected as shown below:

Claim 1, Column 17, line 48, "unabservable" should be --unobservable--.

Claim 11, Column 19, line 28, "coi" should be --coil--.

Claim 11, Column 19, line 30, "is" should be --in--.

Claim 11, Column 19, line 53, "oscillating" should be --oscillator--.

Claim 11, Column 19, line 57, "sighal" should be --signal--.

Claim 11, Column 20, line 1, "and" should be --or--.

Claim 16, Column 20, line 47, "to" should be --so--.

Claim 17, Column 20, line 59, "and" should be --said--.

This Certificate supersedes Certificate of Correction issued January 31, 1978.

Signed and Sealed this

Third Day of October 1978

[SEAL]

Attest:

RUTH C. MASON
*Attesting Officer*

DONALD W. BANNER
*Commissioner of Patents and Trademarks*